G. ATHERTON.
MACHINE FOR BLOCKING AND SHAPING HATS.
APPLICATION FILED JAN. 19, 1910.

993,635.

Patented May 30, 1911.

G. ATHERTON.
MACHINE FOR BLOCKING AND SHAPING HATS.
APPLICATION FILED JAN. 19, 1910.

993,635.

Patented May 30, 1911.

G. ATHERTON.
MACHINE FOR BLOCKING AND SHAPING HATS.
APPLICATION FILED JAN. 19, 1910.

993,635.

Patented May 30, 1911.

UNITED STATES PATENT OFFICE.

GILES ATHERTON, OF STOCKPORT, ENGLAND.

MACHINE FOR BLOCKING AND SHAPING HATS.

993,635.     Specification of Letters Patent.     Patented May 30, 1911.

Application filed January 19, 1910. Serial No. 538,811.

*To all whom it may concern:*

Be it known that I, GILES ATHERTON, a subject of the King of Great Britain and Ireland, residing at Virginia Mills, Higher Hillgate, Stockport, in the county of Chester, England, hatters' engineer, have invented new and useful Improvements in Machines for Blocking and Shaping Hats, of which the following is a specification.

My invention relates to improvements in machines for blocking and shaping hats, and is illustrated in the accompanying drawings, in which.

Figure 1:
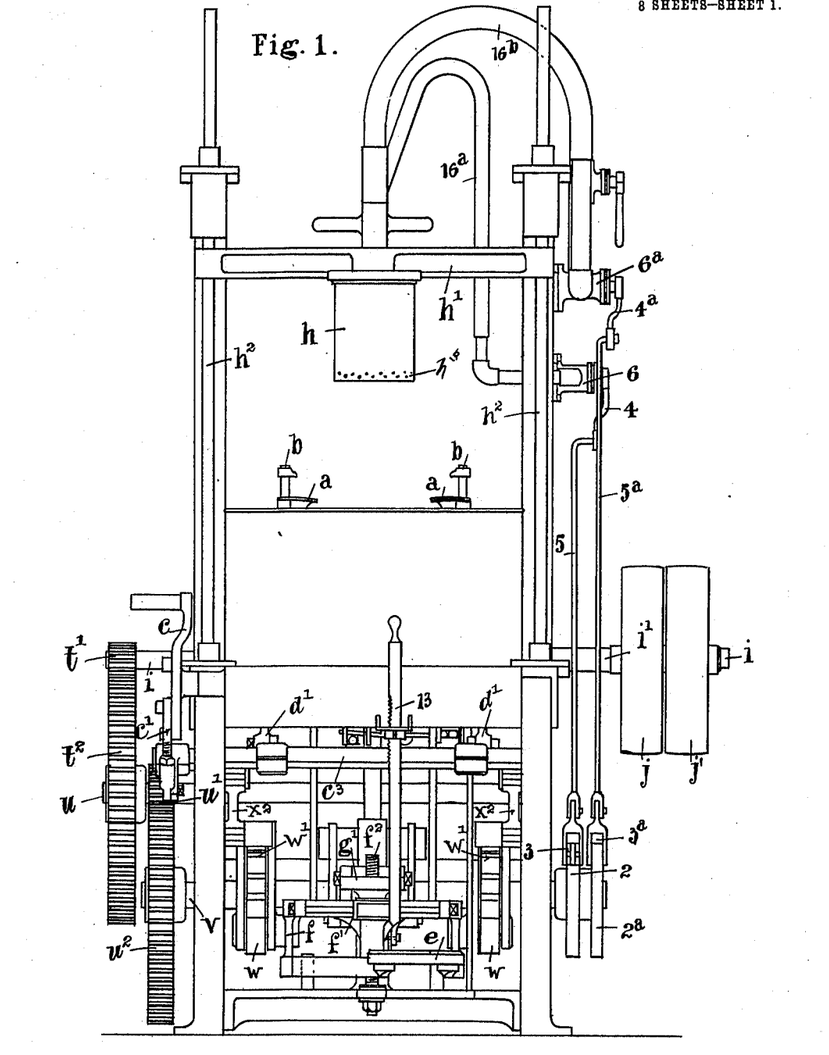
Figure 1 is a front elevation of the machine.
Figure 2:
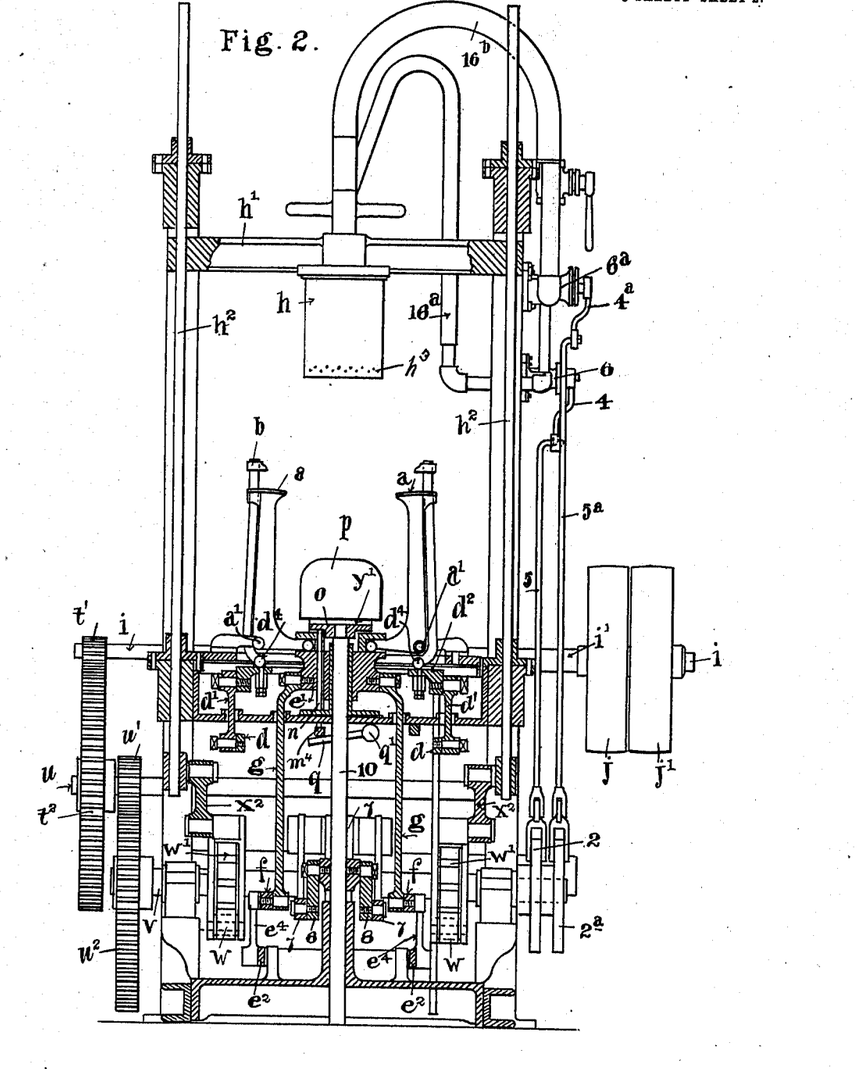
Fig. 2 is a sectional elevation.
Figure 3:
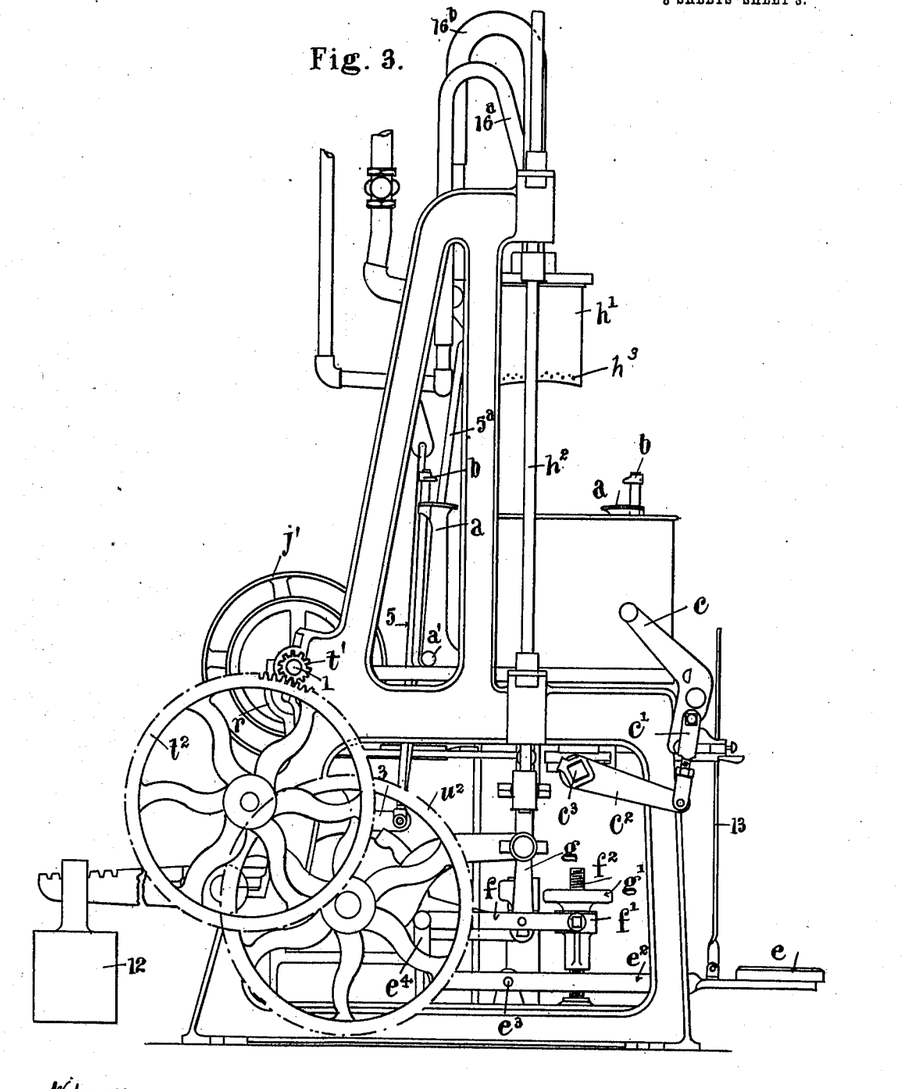
Fig. 3 is a side elevation.
Figure 4:
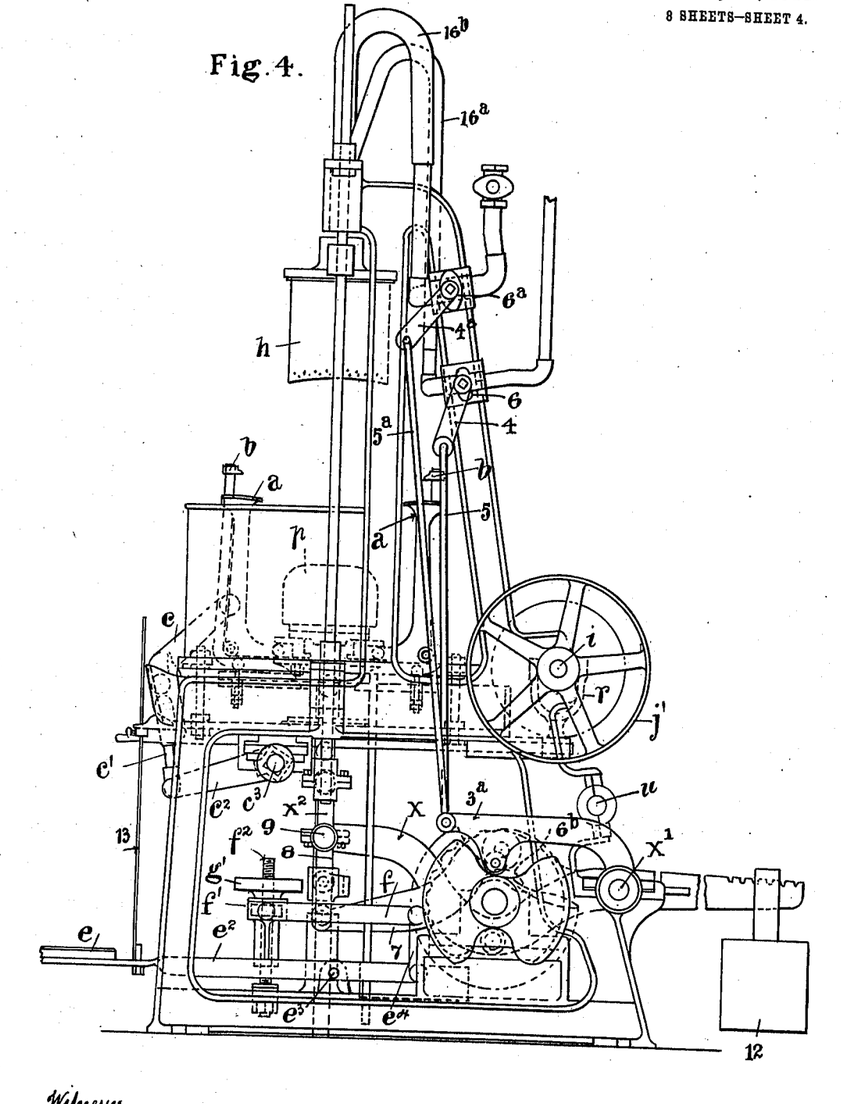
Fig. 4 is a view of the other side of the machine.
Figure 5:
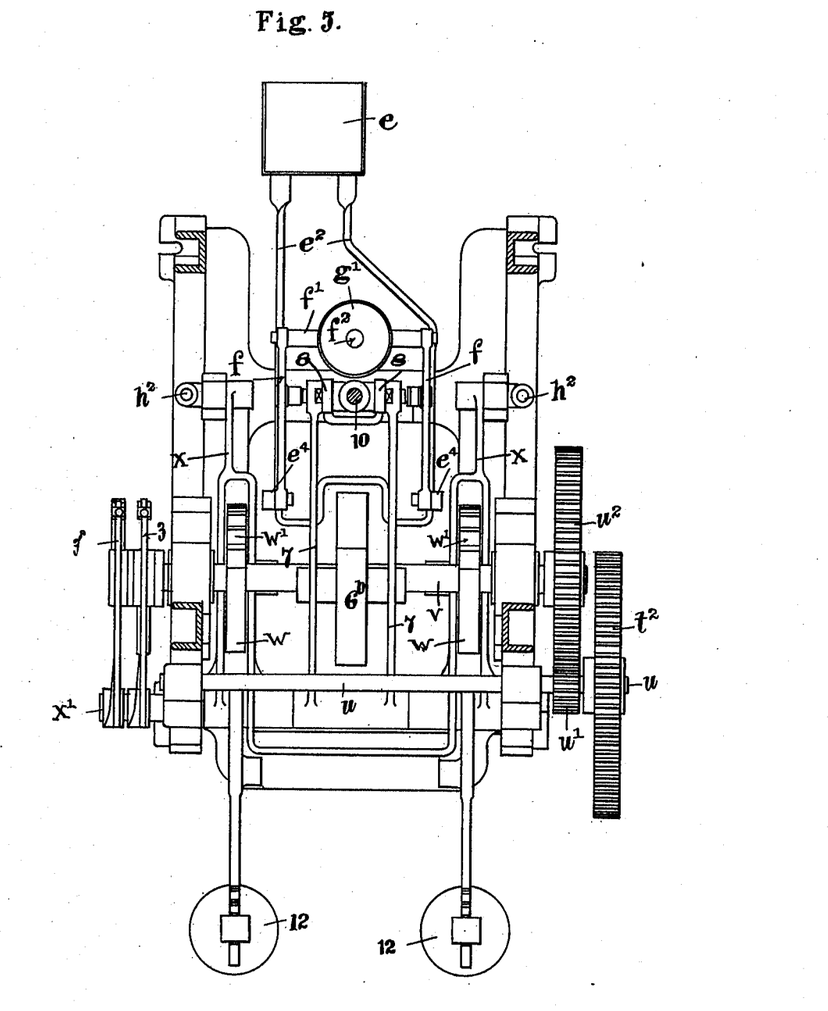
Fig. 5 is a plan view of the machine with the top part removed.

In an apparatus made in accordance with my invention the brim of the previously stretched hat body is placed upon stretching fingers $a$ of a pulling device of a known type, the fingers $a$ being arranged closely together in an oval. For each finger $a$ is an upper clamping finger $b$ and the top clamping fingers $b$ are brought down on the fingers $a$ to clamp the hat in position by means of a hand operated lever $c$ and connected parts, consisting of an adjustable link $c^1$ and lever $c^2$ secured to a cross shaft $c^3$. On the shaft $c^3$ are levers $d$ (see Fig. 2) connected to links $d^1$ which are secured to a ring $d^2$. The partial rotation of the shaft $c^3$ lowers the ring $d^2$ to which the top clamping fingers are pivoted at $d^4$ and thus clamps the hat brim between the fingers $a$ and $b$. If the brim is to be further stretched a foot treadle $e$ is then operated by means of which, through intermediate mechanism, a ring $e^1$ in which are disposed the cranked ends of the stretching fingers $a$, is lifted, forcing the stretching fingers outward on their pivots $a'$ $d^4$ and stretching the brim to the desired extent. The means for raising the ring $e^1$ are as follows. The foot treadle $e$ is carried by side levers $e^2$ pivoted at $e^3$ and connected by links $e^4$ to levers $f$ which are pivoted to a cross head $f^1$ loose on a screwed spindle $f^2$. To the levers $f$ are secured vertical levers $g$ attached to the ring $e^1$. When the foot treadle $e$ is depressed the ring $e^1$ is raised by the connected mechanism. By operating the nut $g^1$ on the screwed spindle $f^2$ the height of the foot treadle from the floor can be adjusted to regulate the amount of stretch to be imparted to the hat brim.

A banding shell $h$ is carried by a cross head $h^1$ secured to side rods $h^2$ which are slidable in suitable bearings in the frame of the machine.

Figure 6:
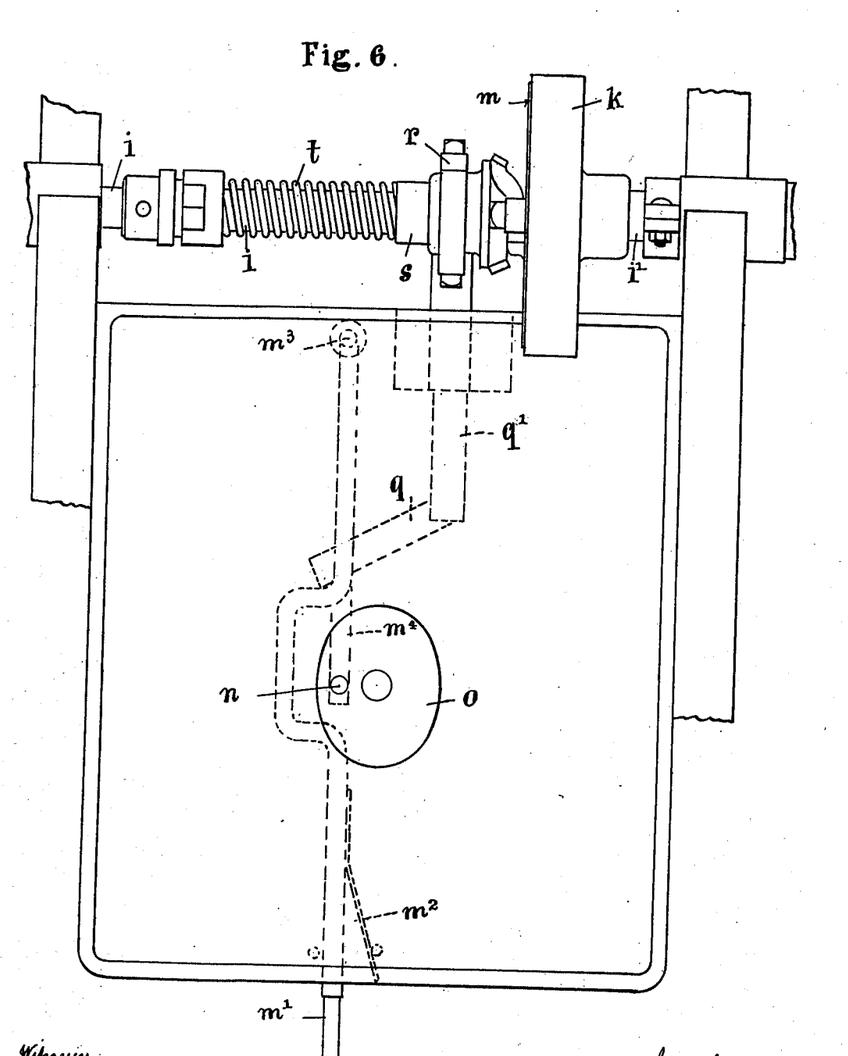
Figs. 6 to 10 are detail parts on a larger scale.
Figure 7:
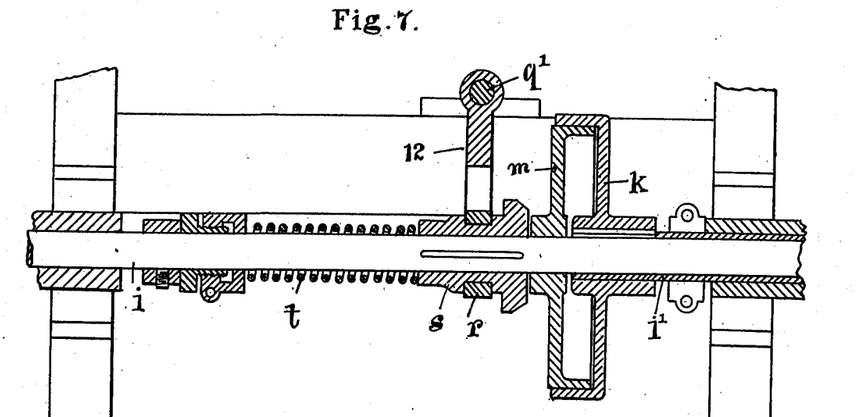
Figure 9:
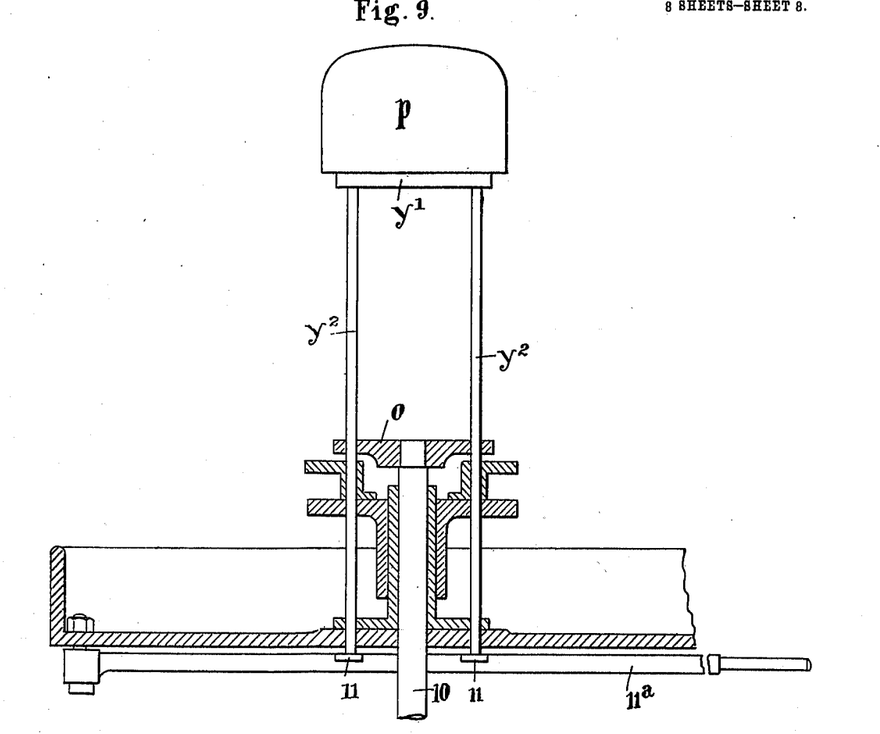
Figure 10:
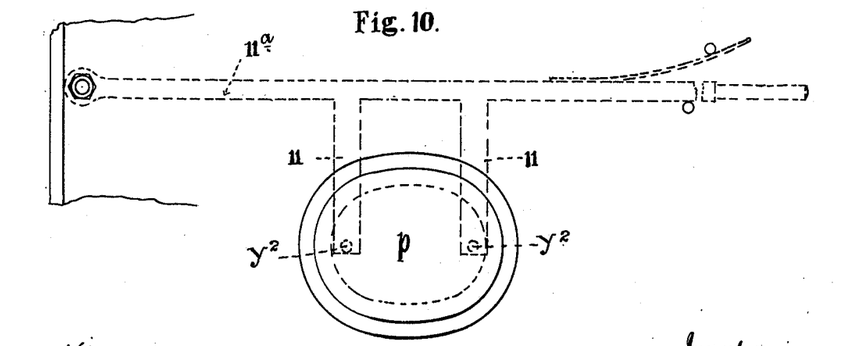

The apparatus is driven by power as follows. On the main driving shaft $i$ is placed a loose sleeve $i^1$ on which is a fast pulley $j$ and loose pulley $j^1$. When the machine is at work the driving belt is placed on the fast pulley. Fixed on the sleeve $i^1$ and revolving therewith is a clutch half $k$ (see Figs. 6 and 7) having an internal expansion ring $m$ keyed upon the driving shaft $i$. When the hat brim has been clamped and stretched as already described the machine is started by shifting the lever $m^1$ to the right against the spring $m^2$ (see Fig. 6). The lever $m^1$ is mounted on a universal joint at $m^3$ and the side movement of it removes a finger $m^4$ carried by the lever $m^1$ from beneath a rod $n$ (see also Fig. 2) secured to the table $o$ of the hat block $p$. When the machine is at rest the weight of the table $o$ of the hat block $p$ resting on the finger $m^4$ depresses the lever $m^1$ and with it the cranked end $q$ of a lever $q^1$ which bears below the lever $m^1$ and which is connected by a lever $l^2$ (Fig. 7) to a yoke $r$ which actuates the friction clutch through the slidable collar $s$. When the machine is at rest the weight of the hat block table $o$ slides the collar $s$ outward but when the weight is removed as above described the spring $t$ thrusts the collar $s$ inward which effects the expansion of the internal friction ring $m$ and the shaft $i$ is driven by the clutch $k$. The expansion clutch described is of well known type and it is unnecessary to describe it in further detail. The motion of the driving shaft is communicated by a pinion $t^1$ to a spur wheel $t^2$ on a shaft $u$ and from a pinion $u^1$ on the shaft $u$ to a spur wheel $u^2$ on a countershaft $v$. When the machine has been thus started cams $w$ on the countershaft $v$, acting on levers $x$ fulcrumed on a fixed shaft $x^1$ by means of connecting links $x^2$ pull down the side rods $h^2$ and the banding shell at the required time upon the hat brim secured to the clamping fingers. This movement of the banding shell down to the level of stationary clamping fingers is a novel feature of my invention. The hat blocking block $p$ is secured upon a plate $y^1$ resting loosely upon the table $o$, the plate having pendent guide rods $y^2$ passing through holes in the table as shown in Fig. 9. When the banding shell $h$ has been lowered as described a rotary cam 2 is arranged through the medium of a pivoted lever 3, lever 4 and a connecting rod 5 to open a valve 6 to turn steam through the flexible pipe $16^a$ into the inside of the banding shell $h$ and at the same time the hat block is raised up to the clamping device $a$ to coöperate with the banding shell $h$. This is effected by means of a cam $6^b$ acting on levers 7 mounted on the shaft $x^1$ the levers being connected by links 8 to a boss 9 secured to the spindle 10 which carries the table $o$. The table $o$ and block $p$ is thus lifted to the banding shell to shape the hat, the plate $y^1$ carrying the hat block being held in its elevated position by a retaining device, which is shown in Figs. 9 and 10, as follows. When the hat block has reached its elevated position two fingers 11 of a spring actuated lever $11^a$ snap beneath the rods $y^2$ and support the hat block until the hat can be removed therefrom. The cams $w$ used to lower the banding shell are formed with notches $w^1$ to give a slow jigging motion to the banding shell $h$ when the shell is in contact with the hat band. Steam is automatically turned off by the continued rotation of the cam and after a short dwell another cam $2^a$ with connected parts $3^a$, $4^a$, $5^a$, similarly actuates a valve $6^a$ to discharge cold water through the pipe $16^b$ into the interior of the banding shell and also cut off the supply when necessary. The bottom of the banding shell has a ring of holes $h^3$ through which steam and water can have access to the hat brim from the interior of the shell. The banding shell is then elevated by the continued rotation of the cam $w$ assisted by a load 12 and the table $o$ is lowered by gravity leaving the plate $y^1$ and block $p$ in position to enable the block and hat body to be removed when the clamping fingers have been released. When the table $o$ is thus lowered the rod $n$ coming into contact with the finger $m^4$ depresses the lever $m^1$ and with it the cranked lever $q$ $q^1$ which is thus turned on its fulcrum and by means of the lever $l^2$ (see Fig. 7) and yoke $r$ slides the collar $s$ outward compressing the spring $t$ and disengaging the clutch and stopping the machine. The spring lever $11^a$ retaining the plate $y^1$ carrying the block is then released by hand and the plate $y^1$ will drop upon the table $o$ being guided by the rods attached to the plate sliding through holes in the table and the sequence of operations on another hat body can be continued.

Figure 8:
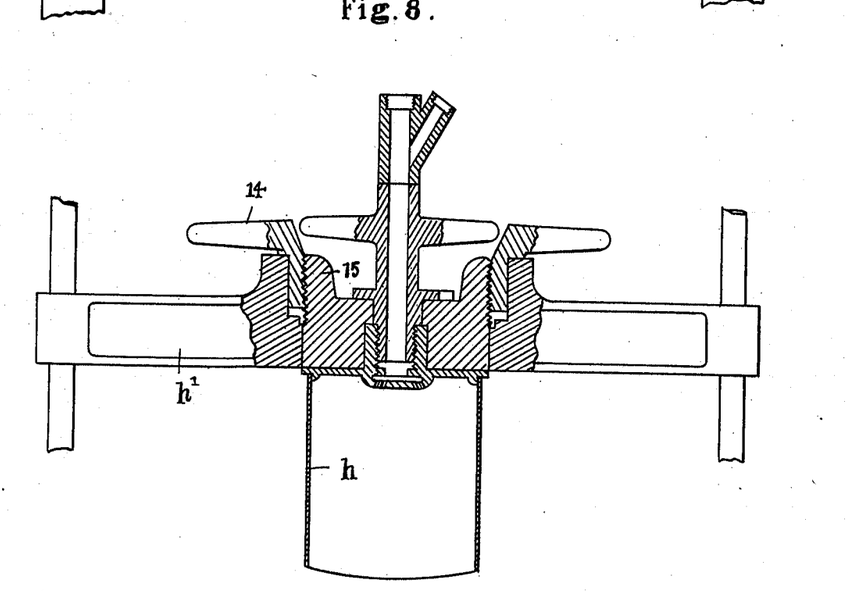

The treadle $e$ is connected to an adjustable rod 13 to limit the rise of the treadle and prevent the stretching fingers $a$ from moving too far inward. The banding shell is or may be provided with ready means of adjustment toward and from the stretching fingers $a$, as shown in Fig. 8. By rotating the handle 14 the screwed part 15 to which the banding shell is secured can be raised or lowered as desired. The means for securing the banding shell $h$ to the part 15 is by an interrupted screw thread after the manner of the breech block of a gun.

I declare that what I claim is.

1. In an apparatus of the indicated nature, a banding shell, a cross-head to which such banding shell is secured, side rods secured to the cross-head, means for bringing down the banding shell onto the hat body and jigging the same slowly, consisting of notched cams, loaded levers actuated by the notched cams, and links connecting the loaded levers to the side rods, means for alternately and independently supplying steam and water to the interior of the banding shell and to the hat brim through holes in the shell and means for again raising the banding shell, substantially as described.

2. In an apparatus of the indicated nature, consisting of a clamping and stretching device for the hat body, a banding shell, a cross-head to which such banding shell is secured, side rods secured to the cross-head, with means for lowering the banding shell to the stretching device and for slowly jigging and for again raising the same, consisting of notched cams, loaded levers actuated by the notched cams, and links connecting the loaded levers to the side rods, a block for the hat and means for raising the block to the banding shell, and for lowering the same, means for alternately and independently supplying steam and water to the hat body and brim through the interior of the banding shell and through holes in the shell, substantially as described.

3. In combination, in apparatus for blocking and shaping hats, a clamping and stretching device for the hat body with means for actuating the same, a banding shell, a cross-head to which such banding shell is secured, side rods secured to the cross-head with means for bringing down such banding shell upon the hat body in the clamping and stretching device and for slowly jigging the same, such means consisting of notched cams, loaded levers actuated by the notched cams, and links connecting the loaded levers to the side rods, a block for blocking the hat, and means for raising the block to the hat body to coöperate with the banding shell, means for supplying the interior of the banding shell alternately and independently with steam and water to act upon the hat body and also upon the brim of the hat through holes in the banding shell, and means for raising the banding shell and lowering the table of the block at the end of the blocking and shaping operation, substantially as described.

4. In combination, in an apparatus for blocking and shaping hats, means for clamping the brim of a hat body and for stretching the same, driving gear for the apparatus, means for starting such driving gear, a banding shell, a cross-head to which such banding shell is secured, side rods secured to the cross-head and mechanism for bringing down such banding shell upon the hat brim and for slowly jigging the same, consisting of notched cams, loaded levers actuated by the notched cams, and links connecting the loaded levers to the side rods, a hat-blocking block with means for raising such block to coöperate with the banding shell, means for supplying the interior of the banding shell alternately and independently with steam and water to act upon the hat body, and upon the brim of the hat through holes in the banding shell, means for raising the banding shell and lowering the table of the hat block at the end of the blocking and shaping operation and for stopping the driving gear, means for retaining the plate carrying the hat block in its elevated position to permit of the removal of the hat body, and for releasing such plate to allow it to fall upon the table when the hat body has been removed, substantially as described.

5. In combination, in apparatus of the indicated nature, the means for raising and lowering the banding shell, consisting of a cross-head carrying the banding shell, side rods to which the cross-head is secured, notched cams, loaded levers actuated by the notched cams, and links connecting the loaded levers to the side rods, means for securing the banding shell to the cross-head and for adjusting the banding shell toward and from the clamping and stretching device, substantially as described.

In testimony whereof I have signed my name to this specification in the presence of two subscribing witnesses.

GILES ATHERTON.

Witnesses:
   JOSHUA ENTWISLE,
   ALFRED YATES.

---

Copies of this patent may be obtained for five cents each, by addressing the "Commissioner of Patents, Washington, D. C."